Sept. 8, 1953  F. KOPPELMANN ET AL  2,651,750
MECHANICAL RECTIFIER

Filed Feb. 14, 1951  6 Sheets-Sheet 4

Inventors
Floris Koppelmann
Helmut Böhm
By Michael ...

Fig. 9

Patented Sept. 8, 1953

2,651,750

UNITED STATES PATENT OFFICE 2,651,750

MECHANICAL RECTIFIER

Floris Koppelmann, Berlin-Siemensstadt, and Helmut Böhm, Berlin-Charlottenburg, Germany, assignors to Licentia Patent-Verwaltungs-G. m. b. H., Hamburg, Germany Application February 14, 1951, Serial No. 210,865
In Germany February 21, 1950

8 Claims. (Cl. 321—48)

The present invention relates to a mechanical rectifier, and more particularly to a mechanical rectifier supplying heavy currents having a short duration such as for the starting of the engine of a motor car or the diesel engine of a locomotive. However, it should be understood that the present invention is also suitable for starting aircraft engines, search lights, welding machines and the like in which a low current of short duration is required.

It is an object of the present invention to increase the life of the contacts of the mechanical rectifier.

It is another object of the present invention to provide a mechanical rectifier which has light and inexpensive contacts.

It is a further object of the present invention to provide a mechanical rectifier which has easily exchangeable contacts.

It is still another object of the present invention to provide a mechanical rectifier which is sturdy and capable of withstanding vibrations and changing atmospheric conditions.

It is a still further object of the present invention to provide a mechanical rectifier which allows to control the duration and the phase of the contacting time during operation of the mechanical rectifier.

It is still another object of the present invention to reduce as far as possible the arcing of the contacts of the mechanical rectifier.

A mechanical rectifier according to the present invention for feeding a load with a large current comprises in combination a polyphase transformer having a plurality of secondary windings arranged in a cycle so as to carry successive phase voltages, respectively, any two of which have equal values at predetermined instants, respectively, a plurality of block-like contact means electrically connected to the secondary windings, respectively, and having each a plurality of interrupting means connected in series to each other, the contact means being adapted to be closed under pressure, thereby rendering the interrupting means inoperative, means for adjusting the closing instants of the contact means, respectively, so as to initiate the commutation of currents in the secondary windings, respectively, before the predetermined instant at which the phase voltage carried by any one of the secondary windings is equal to the phase voltage carried by the next of the secondary windings in the cycle, and means for deriving a direct load current from the block-like contact means.

Preferably the contact means consist of a highly conductive metal having a high melting point such as an alloy of tungsten and silver.

Preferably the voltage across each of the interrupting means is smaller than the minimum voltage required for maintaining a stationary arc across the interrupting means.

Preferably the contact means are exchangeable and means are provided for adjusting the relative position of the contact means.

An embodiment of the present invention suitable for supplying a large current at a direct voltage between 30 volts and approximately 100 volts comprises in combination a three-phase transformer having three secondary windings arranged in a cycle so as to carry successive phase voltages, respectively, any two of which have equal values at predetermined instants, respectively, bridge connections connected to the secondary windings, respectively, each of the bridge connections including a first pair and a second pair of block-like stationary contact means connected to the terminals, respectively, of the secondary windings connected to the bridge connection, a series connection including the load between the bridge connections, the series connection separating the first pair of block-like contact means from the second pair of block-like contact means in each of the bridge connections, a plurality of movable contact means associated, respectively, with the stationary contact means so as to bridge the same in one end position thereof, and means for adjusting the closing instants of the movable contact means, respectively, so as to initiate the commutation of currents in the secondary windings, respectively, before the predetermined instant at which the phase voltage carried by any one of the secondary windings is equal to the phase voltage carried by the next of the secondary windings in the cycle.

Preferably each of the movable contact means effects in the other end position thereof at least a double interruption between the stationary contact means associated therewith.

In a preferred embodiment of the present invention a synchronous motor is fed from the line feeding the polyphase transformer and means are provided for controlling the positions of the movable contact means by the synchronous motor. Preferably means responsive to the load current are provided for automatically reducing the lag of the synchronous motor.

In an embodiment of the present invention means are provided for feeding the transformer intermittently during relatively short times, the transformer having a core having a high degree of saturation during the feeding times of the transformer.

In a preferred embodiment of the present invention means are provided for connecting the transformer to a polyphase line, the means having an operating stage and a preliminary stage including a resistor, and means are provided for starting the synchronous motor by the preliminary stage of the connecting means through the resistor.

Preferably the means for connecting the transformer to the polyphase line are designed as a controller having a manually operated handle, and means are provided for automatically moving the controller from the operating stage to the preliminary stage thereof when the handle is released by the operator.

Preferably a polarized relay is connected to the load circuit for preventing a connection of the mechanical rectifier to the load with a wrong polarity. Preferably a valve rectifier forming part of the electrical connection of the mechanical rectifier is provided for polarizing the relay.

Preferably the means for supporting the interrupting means include a member consisting of a hard fabric and a pad for lubricating the hard fabric.

Preferably chokes are connected between the secondary windings and the block-like contact means, respectively, and means are provided for short circuiting the chokes during a load current of short duration.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
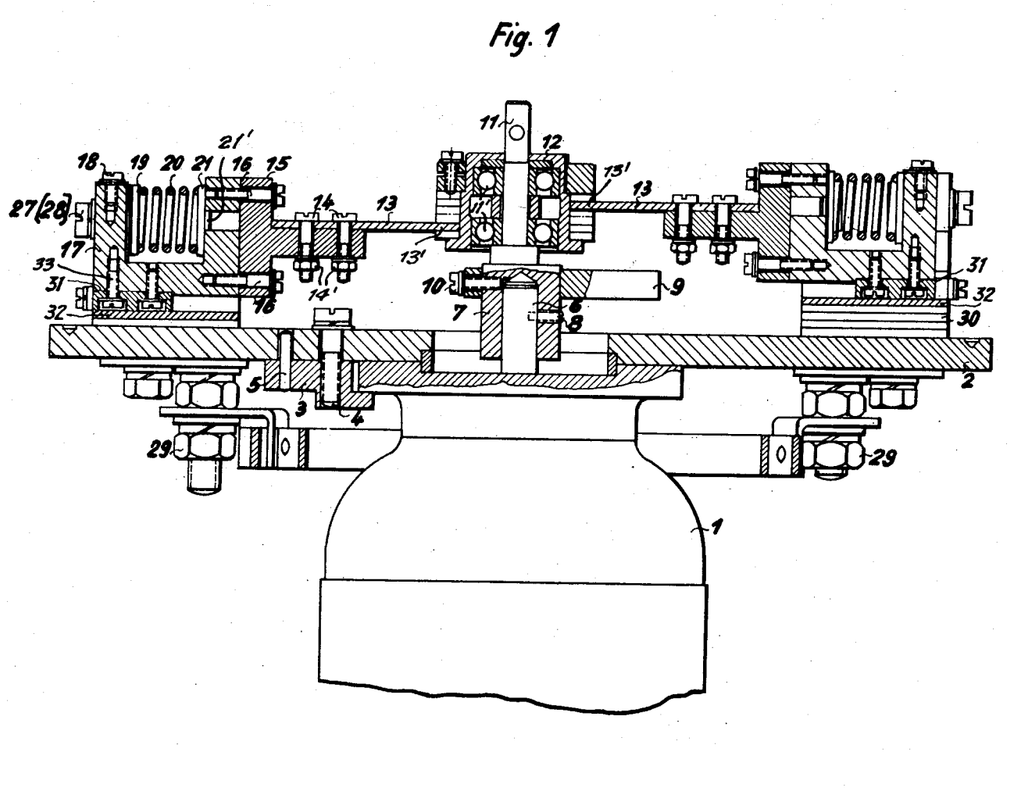
Fig. 1 is a side elevation, partly in section, of a contact arrangement of a mechanical rectifier according to the present invention.
Figure 2:
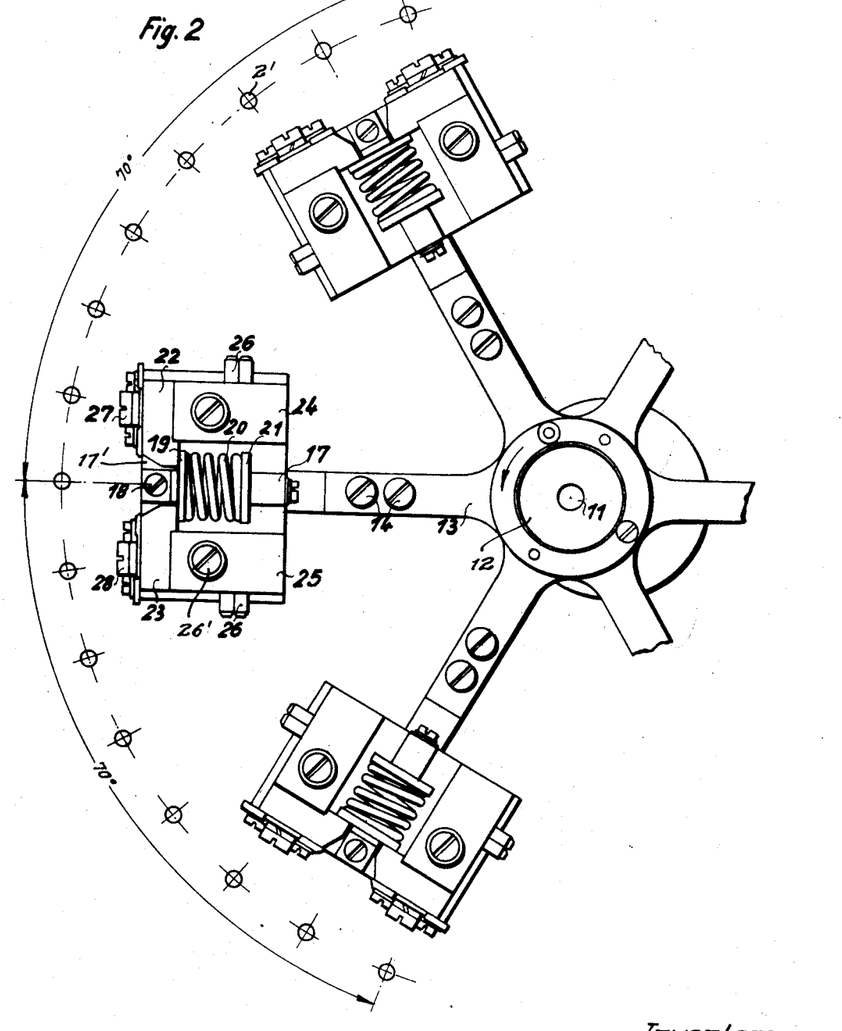
Fig. 2 is a partial plan view of the device shown in Fig. 1.

Referring now to the drawings and first to Figs. 1 and 2, a synchronous motor has a casing 1 and a shaft 6. A plate 2, which may consist of metal or insulating material, is arranged above the synchronous motor, the casing 1 of which is connected to the plate 2 by means of connecting pieces 3 connected to the lower side of the plate 2 by means of screws 4 and pins 5. By loosening the screws 4 and casing 1 of the synchronous motor to which the stator windings (not shown) are secured can be rotated with respect to the plate 2 through a limited angle so that the phase adjustment of the stator field can be corrected.

On the shaft 6 of the synchronous motor a bushing 7 is held in position by means of a set screw 8. The bushing 7 is connected to a rotating body 9 by means of a clamping screw 10. The rotating body 9 is eccentrically shaped and serves for compensating the eccentricity of the eccentric 11 arranged on the upper part of the bushing 7 and the parts connected therewith. The eccentric 11 runs in ball bearings 11' which are located inside a bushing 12 on which are arranged a plurality, for instance six, connecting rods 13 each designed as a flat iron. Each of the connecting rods 13 has one end thereof designed as an annulus 13' surrounding the bushing 12. The connecting rod 13 and the annuli thereof are arranged in different planes one above the other, the contacts described hereinafter and actuated by the different rod 13 being arranged at different heights.

Each connecting rod 13 carries at the end opposite to the annulus 13' an insulating member 15 which is secured to the rod 13 by means of screw bolts 14 and nuts 14'. The insulating member 15 is connected by means of screws 16 to a U-shaped clamp or holder 17 which has a slight width as will be seen from Fig. 2 so that it is free to move between two stationary contacts 22, 23 and contact blocks 24, 25 associated therewith which will be described more in detail hereinafter. The clamp 17 is connected to a contact disc 21 by means of a pin 21'. Each contact disc 21 is connected to a compression spring 20 which is rigidly connected, for instance by soldering, to a contact disc 19 which forms the movable contact member proper. The contact disc 19 is supported by the spring 20 which is very strong and relatively short.

Each contact disc 19 cooperates with two stationary block-like contact members 22, 23 which are separated by a gap 17' into which one end of the clamp 17 projects. The clamp 17 moves during the operation of the device in radial direction forward and backward within the gap 17' thereby causing the contact disc 19 to be pressed against the contact pieces 22, 23 and taking it off from the same, thereby closing and interrupting rhythmically a circuit including the stationary contact members 22, 23. The stationary contact members 22, 23 are attached to contact blocks for 24, 25 by means of screws 27, 28, respectively. By means of pins 26 the contact blocks 24, 25 can be adjusted so that the required contact period is obtained at every forward and backward movement of the contact disc 19 driven by the clamp 17. The contact blocks 24, 25 are connected each to a terminal screw such as 29 arranged on the lower side of the plate 2 for connecting the electrical connections. It should be understood that the contact blocks 24, 25 of different sets are arranged at different heights according to the height of the connecting rod 13 which is achieved by providing sheet plates such as 30 between the base plate 2 and a plate 32 arranged below the contact blocks 24, 25.

In the embodiment shown in Fig. 2, six contacts are arranged in a star-like configuration and in order to adjust the contact time the contact blocks 24, 25 can be adjusted in radial direction by means of screws such as 26'. The adjustment of the contacts can be accomplished by means of a rotating pointer (not shown) which is put on the eccentric 11 and a glow lamp (not shown), the synchronous motor being switched off. For this purpose a plurality of points such as 2' are marked on the contact plate 2 which have an angular distance from one another amounting to 10°. With a three-phase bridge connection to be described more fully hereinafter, the contact time should correspond approximately to 140° so that the adjusting pointer should give a deviation to the left and to the right of the contact of 70° as indicated in the drawing. Within the angle defined by the extreme positions of the pointer the controlling lamp should remain dark.

The operation of this device is as follows:

If the synchronous motor 1 is energized the shaft 6 thereof rotates and moves the eccentric 11, thereby driving each of the connecting rods 13 and the clamp 17 connected thereto in a radial direction at different times. In consequence thereof each contact disc 19 is periodically pressed against, and taken off from, the stationary contact members 22, 23 associated therewith so that the circuit of which the stationary contact members 22, 23 form part is closed and opened periodically. It will be understood that the various discs 19 close the circuits associated therewith at different times as will be explained more in detail hereinafter.

All contacts of the mechanical rectifier are equally designed. If it is intended to avoid the staggered arrangement of the contacts shown in Fig. 1 the connecting rods 13 should be provided with an arc-shaped member instead of the annulus 13', the arc-shaped members forming together an annulus and being held together by a clamping ring or the like. This arrangement has the advantage that all contacts are arranged in the same plane. However, the angular mobility of the connecting rods 13 is retained in this embodiment.

Figure 9:
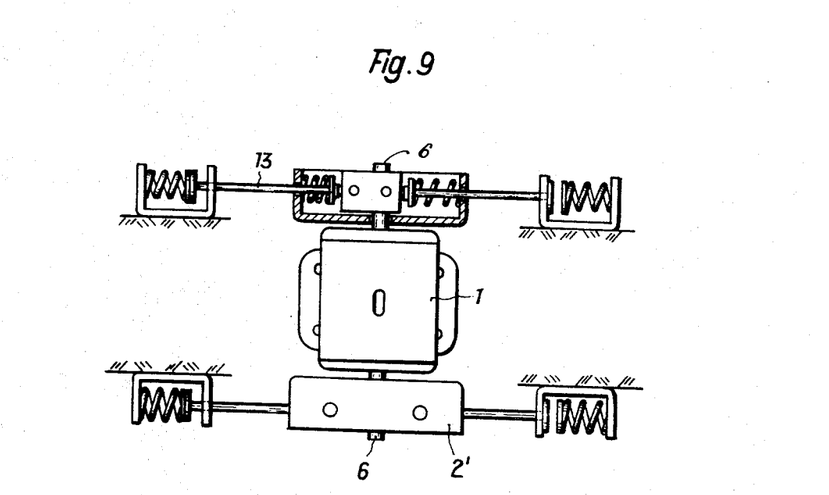
Fig. 9 is a side elevation, partly in section of another embodiment of the invention.

In some cases as will be described hereinafter in connection with Fig. 6, twelve contacts are required instead of six contacts. In order to accomplish this the arrangement shown diagrammatically in Fig. 9 can be used. As will be seen from Fig. 9, another six contacts, two of which are shown in Fig. 9, are arranged at the lower end of the synchronous motor, a second plate 2' being arranged on the opposite side of the casing 1, the shaft 6 projecting in the downward direction of the motor through the second plate.

If desired, however, two contact arrangements may be actuated by one and the same connecting rod 13 which yields a simple arrangement having twelve contacts altogether.

The clamp 17 is supported by a plate 31 consisting of a hard fabric which is attached to the lower side of the clamp 17 by means of two screws 33. The plate 31 consisting of hard fabric moves on a metal sheet plate 32 arranged on the lower side of the plate 31 and below the contact blocks 24, 25. In this connection it should be noted that although the eccentric 11 performs a very rapid motion corresponding to 1500 revolutions per minute of the synchronous motor, the motion of the clamp 17 is relatively small and consists in a periodical forward and backward movement in radial direction the stroke of which does not exceed the eccentricity of the eccentric 11 so that the hard fabric plate is sufficient for supporting the clamp 17. If necessary, the surfaces between the hard fabric plate 31 and the metal sheet plate 32 can be lubricated by means of a lubricating pad (not shown).

Figure 3:
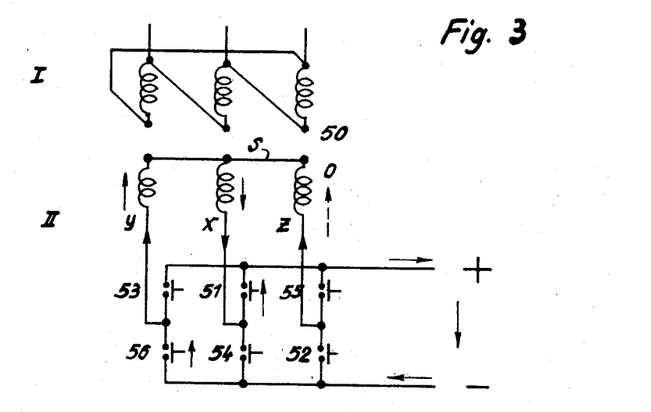
Fig. 3 is a circuit diagram of a three-phase connection incorporating a mechanical rectifier according to the present invention.

Referring now to Fig. 3 showing the circuit diagram incorporating a mechanical rectifier as described hereinabove, 50 denotes a three-phase transformer having a primary I connected in delta connection to a three-phase mains. The secondary II of the transformer 50 is star-connected at S and the ends of the secondary windings X, Y, Z which are not connected to one another are connected to the junctions, respectively, of the contacts 51 and 54, 53 and 56, 52 and 55, of a contact device forming part of the mechanical rectifier more fully described in detail hereinabove with reference to Figs. 1 and 2. Each of the contact devices 51 to 56 consists of two stationary contacts such as 22, 23 and a movable contact 19 described more in detail hereinabove.

It will be understood that at each revolution of the shaft 6 of the synchronous motor the contact devices 51 to 56 are closed for a predetermined part of the cycle of revolutions, the closing times of the contact devices 51 to 56 being staggered. The load circuit is connected with the positive terminal thereof to one of the stationary contact members of the contact devices 51, 53 and 55, whereas the negative terminal of the load circuit is connected to one of the stationary contact members of the contact devices 52, 54 and 56.

Figure 4:
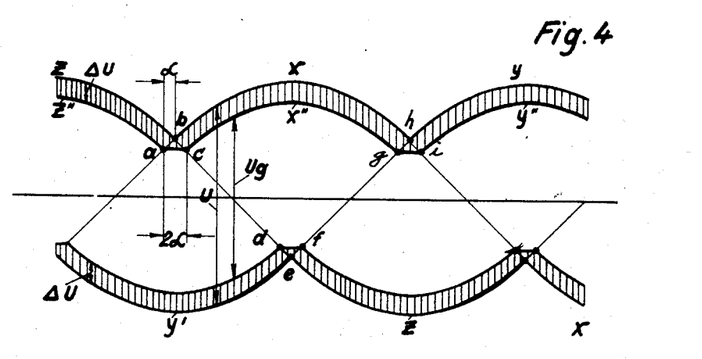
Figs. 4 and 5 are curve diagrams for explaining the operation of the arrangement shown in Fig. 3.

The operation of this device is as follows:

In Fig. 4 the horizontal zero line S corresponds to the star point S of the secondary II of the transformer 50, having a zero potential to which all other potentials are referred. At the secondary windings of the transformer 50 are produced the voltages denoted by X, Y, Z in Fig. 4 which are temporarily applied to the load. If it is assumed for instance that the contacts 51 and 56 are simultaneously closed at a certain instant, the other contacts 52 to 55 being open, a circuit indicated by the arrows in Fig. 3 is closed in which the current runs from the star point S, over the phase winding X, the contact 51, the positive terminal of the load, the load, the negative terminal of the load, the contact 56, the phase winding Y back to the star point S. Therefore the load is fed by a voltage U which is indicated in Fig. 4 by the ordinate between the positive part of the curve X and the negative part of the curve Y'. When the voltage point e is reached contact 56 is opened while contact 52 is closed so that now the load is fed from the secondary windings X and Z. However, this transit takes a certain time which is determined by the inductances of the circuit.

As a rule, the transformer 50 has a very small inductance whereas the ohmic resistance thereof is relatively large so that an internal voltage drop $\Delta U$ is incurred which changes the voltage curves X, Y, Z to the curves X'', Y'', Z'', respectively, which are a little below the curves X, Y, and Z, respectively. In consequence thereof, the voltage applied to the load is reduced to the voltage $U_g$ between the inner curves in Fig. 4. Furthermore, the transition between the contacts 56 and 52 does not occur at the point e but begins at the point d and lasts until the point f is reached so that during the transition time the conacts 56 and 52 and the secondary windings Y and Z are connected in parallel. Owing to this parallel connection the ohmic voltage drop is reduced in the transition zone to approximately one half so that the voltage curve follows approximately the course of the curve between the points d and f. Similarly the exchange of the contacts 55 and 51 is performed in such a way that both contacts are closed for a short time represented by the voltage points $a$ and $c$ of Fig. 4 whereas if the transformer had no internal voltage drop the phase voltages X and Z would be equal to each other only at the voltage point $b$ and contacts 51 and 55 would exchange their parts at this voltage point. However, owing to the ohmic voltage drop, the curve X of the unloaded phase cuts the curve Z″ of the loaded phase at the point $a$ which is lower than the curve Z by the voltage drop $\Delta U$. Therefore the exchange of the contacts is advanced in time by the small angle $\alpha$ and lasts until the voltage point $c$ at which the phase Z is switched off, the load current being taken over by the phase X. The total exchange time is $2\alpha$ and is arranged symmetrically to the voltage point $b$. Similarly the exchange between contacts 51 and 53 occurs between the voltage points $g$ and $i$ and the exchange between contacts 52 and 54 between the voltage points $j$ and $l$.

Figure 5:
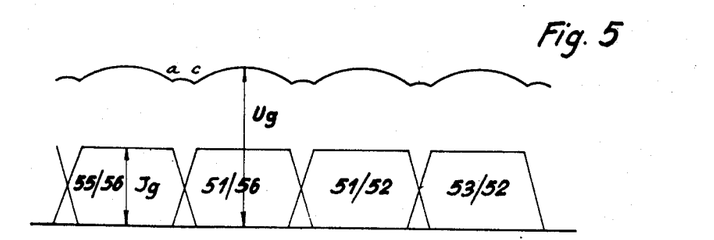

Referring now to Fig. 5, a time diagram is shown of the voltage $U_g$ and the current $I_g$ caused by the voltage $U_g$. The current $I_g$ is the resultant of trapezium-shaped blocks which are denoted by the numbers of simultaneously closed contacts 55/56, 51/56, etc. which cause the trapezium-shaped currents to flow. It should be understood that this representation is simplified since the inductances of the circuit have the effect of smoothing the corners of the trapezoidal current curves. As will be seen from Fig. 5, the trapezium-shaped current curves caused by the simultaneous closing of contacts 55 and 56 have their horizontal portion ending at a time corresponding to the voltage point $a$ at which the contact 56 closes simultaneously with the contact 51. The current curve in the interval between the voltage points $a$ and $c$ corresponds to a superposition of the blocks 55/56 and 51/56 which is substantially constant because the current represented by the side of the trapezium 55/56 slanting downward is superposed to the current represented by the side of the trapezium 55/56 slanting upward.

Figure 6:
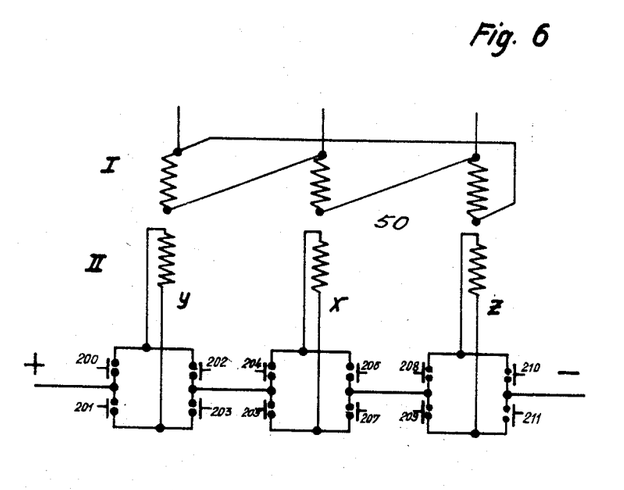
Fig. 6 is a circuit diagram of an alternative embodiment of a connection, incorporating a mechanical rectifier according to the present invention.

Referring now to Fig. 6, a circuit is shown which is suitable for higher direct voltage amounting to 30 volts to approximately 100 volts. A transformer 50 has a delta-connected primary winding I connected to a feeding line whereas the secondary winding II thereof consists of three single-phase windings X, Y, Z which are connected each to a single-phase bridge connection. Each bridge connection comprises four contact devices such as the contact devices more fully described hereinbefore in connection with Figs. 1 and 2. The contact devices of the bridge connected to the phase winding Y are denoted by 200 to 203, the contact devices of the bridge connected to the phase winding X are denoted by 204 to 207, and the contact devices of the bridge connected to the phase winding Z are denoted by 208 to 211. The junction of the contact devices 200 and 202 is connected to one terminal of winding Y whereas the junction of contact devices 201 and 203 is connected to the other terminal of winding Y. Similarly the junction of contact devices 204 and 206 is connected to one terminal of the winding X whereas the junction of contact devices 205 and 207 is connected to the other terminal of winding X. Finally the junction of contact devices 208 and 210 is connected to one terminal of winding Z whereas the junction of contact devices 209 and 211 is connected to the other terminal of winding Z. The junctions of contact devices 202, 203 and contact devices 204 and 205 are directly connected to each other and in a similar manner the junctions of contact devices 206 and 207 and contact devices 208, 209 are directly connected to each other, the junction of contact devices 200, 201 is connected to the positive terminal of the load and the junction of contact devices 210, 211 is connected to the negative terminal of the load so that the three bridge connections are connected in series with one another and the load.

The operation of this device is substantially the same as that of the device shown in Fig. 3. However, contact devices 200 and 203 are closed during a positive half-cycle and contact devices 201 and 202 are closed during a negative half-cycle of the voltage produced in the transformer winding Y. Thus if the voltage in the transformer winding Y is in the positive half-cycle thereof, the circuit is closed through the contact 200, the winding Y and the contact 203. Similarly in the other bridge connections the contacts 204 and 207 are closed during the positive half-cycle of the voltage produced in the winding X and the contacts 205 and 206 are closed during the negative half-cycle of the voltage produced in the winding X. During a positive half-cycle of the voltage produced in the winding Z the contacts 208 and 211 are closed whereas during the negative half-cycle of this voltage the contacts 209 and 210 are closed. If the staggering in time of the individual half-cycles of the three-phase current is taken into regard, it will be seen that at a certain instant for instance the contacts 200, 203, 204, 207, 209 and 210 are closed so that the three voltages produced in the windings Y, X, Z are added. The time during which all contacts are closed in a fraction of the total time of a half cycle of the alternating current similar to the time $2\alpha$ referred to hereinabove. It will be understood that the three bridge connections are connected in series with one another and thus yield a total voltage which is substantially the sum of the voltage of each of the phases X, Y, Z. This involves the advantage that the operating voltage of the individual contact devices may remain below the arcing voltage, for instance 20 volts, and all the same a total direct voltage of about 60 volts is obtained.

For still higher direct voltages the contacts are preferably designed in such a manner that more than two interrupting gaps are opened simultaneously. This can be accomplished by replacing each of the stationary contact pieces 22, 23 by a pair of stationary contact pieces which are bridged each by a contact disc, the contact discs being actuated by the same connecting rod. One contact piece of one pair is connected to one contact of the other pair so that the number of interrupting gaps is double. In similar manner the number of interrupting gaps might be trebled and even quadrupled.

The contact devices are periodically opened and closed by a synchronous motor as more fully described hereinabove. If the mechanical rectifier is supplying a current to a load a phase lag should be imparted to the synchronous motor which is adapted to the intensity of the load current. Preferably to this purpose the voltage drop in the cable connecting the primary of the transformer 50 to the mains is used.

Figure 7:
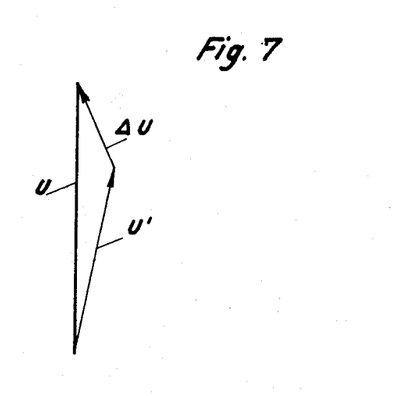
Fig. 7 is a vector diagram of the voltages produced in the primary of the transformer shown in Figs. 3 and 6.

Referring now to Fig. 7, a voltage diagram of one of the phases of the mains connected to the primary of the transformer 50 is shown. The line voltage at no load is represented by the vector U. If a load is connected to the mechanical rectifier the voltage drop in the line is equal to ΔU and reduces the line voltage to U'. The synchronous motor driving the contacts of the mechanical rectifier is fed by this reduced line voltage and therefore lags in the phase behind the voltage at no load. By a correspondingly dimensioned cable between the synchronous motor and the three-phase mains which preferably contains a resistor, the lag can be adapted to the magnitude of the load.

Alternatively, at a fixed phase position of the synchronous motor the saturation of the core of the transformer 50 may be increased during the feeding times of the transformer so that the passing of the current through zero is only slightly affected by the load and the mechanical rectifier operates substantially without sparks at every load.

Figure 8:
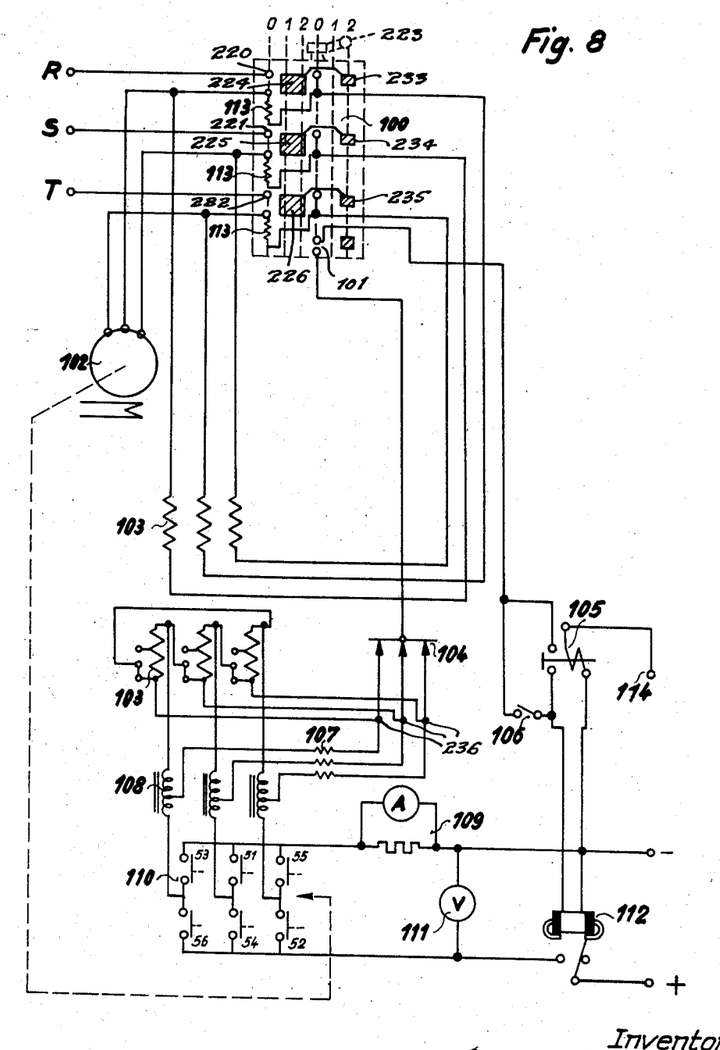
Fig. 8 is a circuit diagram of a complete mechanical rectifier and the parts associated therewith.

Referring now to Fig. 8 a complete circuit diagram of a mechanical rectifier according to the invention, and the parts connected therewith is shown. The three-phase mains R, S, T are connected to contacts 220, 221 and 222, respectively, of a drum switch 100 provided with a manually operated handle 223. The drum switch 100 has three stages denoted by the numbers 0, 1, and 2, respectively, of which the number 0 relates to the switch-off position, the number 1 to a preliminary stage corresponding to no load, and the number 2 to the operating stage of the switch. The drum of the switch 100 carries conducting segments 224 to 226 and 233 to 235 hatched in the drawings. In the position 1 of the switch 100 a connection is established to the primary I of a transformer 103 connected over resistors 113. The transformer 103 corresponds to the transformer 50 in Fig. 3. Also the synchronous motor 102 corresponding to the synchronous motor the casing 1 of which is shown in Figs. 1 and 2, is started in the preliminary stage of switch 100. In the operating position of the drum switch 100, however, the transformer primary is directly connected in Δ-connection to the mains, the resistors 113 being cut out of the circuit in stage 2 of the switch. An auxiliary switch 101 is connected to the handle 223 so that it is closed in the position 2 of the switch 100. The synchronous motor 102 serves for driving the movable contact members of the contacts 51 to 56 of the mechanical rectifier denoted generally by reference numeral 110 and being designed as more fully described hereinafter in connection with Figs. 1 and 2. The secondary II of the transformer 103 is connected in delta connection and has one terminal of each secondary winding connected to one terminal of each of the windings of the chokes 108, respectively, the other terminals of which are connected to one stationary contact member of each pair of contacts 51 to 56, respectively. A selenium rectifier 104 is connected to the auxiliary switch 101 and to connecting points 236 which are connected over resistors 107 to the mid-points of the windings of the chokes 108 and to the other terminals of the secondary windings II, respectively. 105 is an auxiliary relay for controlling the starting of the device from the driver's seat over a terminal 114 of a voltage source (not shown). A tumbler switch 106 allows to control the starting of the device either from the driver's seat over the terminal 114 or from the starting device itself which can be at a remote position. 109 is an ammeter and 111 a voltmeter inserted in the output side of the mechanical rectifier 110. 112 is a relay for switching in the load (not shown) such as the starting engine of a motor car.

The operation of this device is as follows:

If the drum switch 100 is actuated the transformer 103 is connected to the mains at first over the resistors 113. At the same time the synchronous motor 102 is started. When the mechanical rectifier 110 is in operation the drum switch 100 is switched into the operating stage 2 and the load is connected through the relay 112 if the polarity thereof matches that of the output of the mechanical rectifier.

The drum switch 100 may be under action of a spring (not shown) which automatically returns the drum switch from the operating stage 2 to the preliminary or starting stage 1 when the handle 223 is released by the operator.

The polarized relay 112 prevents a connection of the mechanical rectifier 110 with the wrong polarity to the load. The winding of the relay 112 is energized by the rectifier 104 which forms part of the electric connection of the mechanical rectifier because the rectifier 104 together with the three upper contacts 51, 53, 55 of the mechanical rectifier forms a complete three-phase bridge connection so that if the polarity is right the winding of the relay 112 is energized by the full voltage so that the relay 112 attracts its armature. If, however, the polarity is wrong, both terminals of the winding of relay 112 are connected to the positive voltage so that the relay remains de-energized. The selenium rectifier 104 cannot be directly inserted into the direct current connections because the selenium rectifier would lose the blocking action thereof at a permanent load.

Occasionally the mechanical rectifier must supply a relatively low permanent direct current apart from the high intermittent current. In such a case preferably small chokes are provided in series to the mechanical rectifier 110 which, however, are only inserted during the permanent load and are short-circuited during the intermittent loads of high intensity. It would be easy to modify the chokes 108 to satisfy this condition. If required, the chokes can be provided with preliminary exciting windings and the contacts 51 to 56 of the mechanical rectifier can be provided with condenser, steadying resistors or the like which bridge the contact members. For a preliminary excitation of the chokes the main windings thereof can be used if it is possible to separate the circuits galvanically or if not, if the suitable voltages can be taken from taps of the transformer 103.

It will be understood that each of the elements described above, or two or more together, may also find a useful application in other types of mechanical rectifiers differing from the types described above.

While the invention has been illustrated and described as embodied in a mechanical rectifier supplying low currents having a short duration, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of the prior art, fairly constitute essential characteristics of the generic or specific aspects of this invention and, therefore, such adaptations should

What is claimed as new and desired to be secured by Letters Patent is:

1. A mechanical rectifier for feeding a load with a large current at a direct voltage between 30 volts and approximately 100 volts, comprising in combination, a three-phase transformer having three secondary windings arranged in a cycle so as to carry successive phase voltages, respectively, any two of which have equal values at predetermined instants, respectively; bridge connections connected to said secondary windings, respectively, each of said bridge connections including a first and a second pair of block-like stationary contact means connected to the terminals, respectively, of said secondary windings connected to said bridge connections; a series connection including the load between said bridge connections, said series connection separating said first pair of block-like contact means from said second pair of block-like contact means in each of said bridge connections; a plurality of movable contact means associated, respectively, with said stationary contact means so as to bridge the same in one end position thereof, said contact means consisting of a tungsten silver alloy; and means for adjusting the closing instants of said movable contact means, respectively, so as to initiate the commutation of currents in said secondary windings, respectively, before the predetermined instant at which the phase voltage carried by any one of said secondary windings is equal to the phase voltage carried by the next of said secondary windings in the cycle.

2. A mechanical rectifier for feeding a load with a large current at a direct voltage between 30 volts and approximately 100 volts, comprising in combination, a three-phase transformer having three secondary windings arranged in a cycle so as to carry successive phase voltages, respectively, any two of which have equal values at predetermined instants, respectively; bridge connections connected to said secondary windings, respectively, each of said bridge connections including a first pair and a second pair of block-like stationary contact means connected to the terminals, respectively, of said secondary windings connected to said bridge connections; a series connection including the load between said bridge connections, said series connection separating said first pair of block-like contact means from said second pair of block-like contact means in each of said bridge connections; a plurality of movable contact means associated, respectively, with said stationary contact means so as to bridge the same in one end position thereof, each of said movable contact means effecting in the other end position thereof at least a double interruption between said stationary contact means associated therewith, said contact means consisting of a tungsten silver alloy; and means for adjusting the closing instants of said movable contact means, respectively, so as to initiate the commutation of currents in said secondary windings, respectively, before the predetermined instant at which the phase voltage carried by any one of said secondary windings is equal to the phase voltage carried by the next of said secondary windings in the cycle.

3. A mechanical rectifier for feeding a load with a large current, comprising in combination, a polyphase transformer having a plurality of secondary windings arranged in a cycle so as to carry successive phase voltages, respectively, any two of which have equal values at predetermined instants, respectively; means for connecting said transformer to a polyphase line, said means having an operating stage and a preliminary stage including a resistor; a plurality of block-like contact means electrically connected to said secondary windings, respectively; a plurality of movable contact means associated, respectively, with said block-like contact means so as to bridge the same in one end position thereof, said contact means consisting of a tungsten silver alloy; a synchronous motor; means for starting said synchronous motor by said preliminary stage of said connecting means through said resistor; means for controlling the positions of said movable contact means by said synchronous motor; means for adjusting the closing instants of said movable contact means, respectively, so as to initiate the commutation of currents in said secondary windings, respectively, before the predetermined instant at which the phase voltage carried by any one of said secondary windings is equal to the phase voltage carried by the next of said secondary windings in the cycle; and means for deriving a direct load current from said block-like contact means.

4. A mechanical rectifier for feeding a load with a large current, comprising in combination, a polyphase transformer having a plurality of secondary windings arranged in a cycle so as to carry successive phase voltages, respectively, any two of which have equal values at predetermined instants, respectively; a controller for connecting said transformer to a polyphase line, said controller having an operating stage and a preliminary stage including a resistor, said controller having a manually operated handle; means for automatically moving said controller from the operating stage to the preliminary stage thereof when said handle is released by the operator; a plurality of block-like contact means electrically connected to said secondary windings, respectively; a plurality of movable contact means associated, respectively, with said block-like contact means so as to bridge the same in one end position thereof, said contact means consisting of a tungsten silver alloy; a synchronous motor; means for starting said synchronous motor by said preliminary stage of said connecting means through said resistor; means for controlling the positions of said movable contact means by said synchronous motor; means for adjusting the closing instants of said movable contact means, respectively, so as to initiate the commutation of currents in said secondary windings, respectively, before the predetermined instant at which the phase voltage carried by any one of said secondary windings is equal to the phase voltage carried by the next of said secondary windings in the cycle; and means for deriving a direct load current from said block-like contact means.

5. A mechanical rectifier for feeding a load with a large current, comprising in combination, a polyphase transformer having a plurality of secondary windings arranged in a cycle so as to carry successive phase voltages, respectively, any two of which have equal values at predetermined instants, respectively; a plurality of block-like contact means electrically connected to said secondary windings, respectively; a plurality of movable contact means associated, respectively, with said block-like contact means so as to bridge the same in one end position thereof, said contact means consisting of a tungsten silver alloy;

a synchronous motor fed from the line feeding said polyphase transformer; means for controlling the positions of said movable contact means by said synchronous motor; means for adjusting the closing instants of said movable contact means, respectively, so as to initiate the commutation of currents in said secondary windings, respectively, before the predetermined instant at which the phase voltage carried by any one of said secondary windings is equal to the phase voltage carried by the next of said secondary windings in the cycle; means for deriving a direct load current from said block-like contact means; and a polarized relay connected to the load circuit for preventing a connection of the mechanical rectifier to the load with a wrong polarity.

6. A mechanical rectifier for feeding a load with a large current, comprising in combination, a polyphase transformer having a plurality of secondary windings arranged in a cycle so as to carry successive phase voltages, respectively, any two of which have equal values at predetermined instants, respectively; a plurality of block-like contact means electrically connected to said secondary windings, respectively; a plurality of movable contact means associated, respectively, with said block-like contact means so as to bridge the same in one end position thereof, said contact means consisting of a tungsten silver alloy; a synchronous motor fed from the line feeding said polyphase transformer; means for controlling the positions of said movable contact means by said synchronous motor; means for adjusting the closing instants of said movable contact means, respectively, so as to initiate the commutation of currents in said secondary windings, respectively, before the predetermined instant at which the phase voltage carried by any one of said secondary windings is equal to the phase voltage carried by the next of said secondary windings in the cycle; means for deriving a direct load current from said block-like contact means; a polarized relay connected to the load circuit for preventing a connection of the mechanical rectifier to the load with a wrong polarity; and a valve rectifier for polarizing said relay, said rectifier forming part of the electrical connection of the mechanical rectifier.

7. A mechanical rectifier for feeding a load with a large current, comprising in combination, a polyphase transformer having a plurality of secondary windings arranged in a cycle so as to carry successive phase voltages, respectively, any two of which have equal values at predetermined instants, respectively; a plurality of block-like contact means electrically connected to said secondary windings, respectively, and having each a plurality of interrupting means connected in series with each other, said contact means being adapted to be closed under pressure, thereby rendering said interrupting means inoperative, said contact means consisting of a tungsten silver alloy; means for adjusting the closing instants of said contact means, respectively, so as to initiate the commutation of currents in said secondary windings, respectively, before the predetermined instant at which the phase voltage carried by any one of said secondary windings is equal to the phase voltage carried by the next of said secondary windings in the cycle; means for deriving a direct load current from said block-like contact means; and means for supporting said interrupting means and including a member consisting of a hard fabric and a pad for lubricating said hard fabric.

8. A mechanical rectifier for feeding a load with a large current, comprising in combination, a polyphase transformer having a plurality of secondary windings arranged in a cycle so as to carry successive phase voltages, respectively, any two of which have equal values at predetermined instants, respectively; a plurality of block-like contact means electrically connected to said secondary windings, respectively, and having each a plurality of interrupting means connected in series with each other, said contact means being adapted to be closed under pressure, thereby rendering said interrupting means inoperative, said contact means consisting of a tungsten silver alloy; means for adjusting the closing instants of said contact means, respectively, so as to initiate the commutation of currents in said secondary windings, respectively, before the predetermined instant at which the phase voltage carried by any one of said secondary windings is equal to the phase voltage carried by the next of said secondary windings in the cycle; means for deriving a direct load current from said block-like contact means; chokes connected between said secondary windings and said block-like contact means, respectively; and means for short-circuiting said chokes during a load current of short duration.

FLORIS KOPPELMANN.
HELMUT BÖHM.

References Cited in the file of this patent

UNITED STATES PATENTS

| Number | Name | Date |
|---|---|---|
| 2,116,899 | Kalsey | May 10, 1938 |
| 2,188,361 | Koppelmann | Jan. 30, 1940 |
| 2,195,818 | Koppelmann et al. | Apr. 2, 1940 |
| 2,225,644 | Koppelmann | Dec. 24, 1940 |
| 2,227,937 | Koppelmann | Jan. 7, 1941 |
| 2,247,361 | Corbitt | July 1, 1941 |
| 2,340,098 | Zahlke | Jan. 25, 1944 |

FOREIGN PATENTS

| Number | Country | Date |
|---|---|---|
| 851,731 | France | Oct. 9, 1939 |
| 881,582 | France | Apr. 28, 1942 |
| 700,220 | Germany | Dec. 16, 1940 |
| 712,446 | Germany | Sept. 25, 1941 |